United States Patent Office 3,260,732
Patented July 12, 1966

3,260,732
N-(METHYLCARBAMYL)-5-NITRO-2-FURAMIDOXIME
Harry Raymond Snyder, Jr., Norwich, N.Y., assignor to The Norwich Pharmacal Company, Norwich, N.Y., a corporation of New York
No Drawing. Filed Jan. 15, 1964, Ser. No. 337,747
1 Claim. (Cl. 260—347.3)

This invention relates to the new chemical compound N-(methylcarbamyl)-5-nitro-2-furamidoxime of the formula:

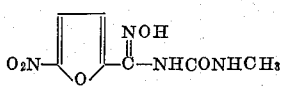

to methods for the preparation thereof and to compositions comprising it.

This new compound possesses excellent antiseptic activity being capable of inhibiting the growth of microorganisms such as *Staphylococcus aureus*, *Streptococcus pyogenes*, *Salmonella typhosa*, *Escherichia coli* and the like.

It is thus adapted to be combined with various known excipients and adjuvants in the form of dusts, solutions, suspensions, ointments, sprays to provide compositions useful for disinfecting purposes.

This new compound is also capable of combatting systemic infections produced by *Salmonella typhosa*, *Escherichia coli*, *Trypanosoma gambiense* or *Eimeria tenella* upon oral administration to a host infected thereby in dosages well below the toxic limit. Thus, upon oral administration of a dose of about 100 mg./kg. to mice infected by *Salmonella typhosa* or *Escherichia coli*, mortality from infection is curbed.

A dose of from 30–50 mg./kg. of this new compound to mice infected with *Trypanosoma gambiense* serves to suppress the infection induced by that organism.

When combined in the diet of chickens at a level of from 0.011–0.022% by weight this new compound serves to check the ravages of coccidiosis provoked by *Eimeria tenella*.

The ability of this new compound to combat a variety of infections makes it a valuable therapeutic agent.

The compound of this invention is readily prepared by bringing together 5-nitro-2-furamidoxime and methyl isocyanate. In carrying out the reaction a solvent such as pyridine is advantageously employed. Upon completion of the reaction the product may be recrystallized from a suitable solvent such as isopropanol. In order that the compound of this invention and the manner of making it may be readily available to those skilled in the art, the following example is supplied:

5-nitro-2-furamidoxime (51.3 g., 0.3 mole) is dissolved in pyridine (500 ml.). Methyl isocyanate (17.1 g., 17.7 ml., 0.3 mole) is added to the solution. The mixture is allowed to stand at room temperature overnight. The solvent is removed under reduced pressure. The residue is recrystallized from isopropyl alcohol to yield 31 g. (45.2%), M.P. 165–167°.

Further recrystallization from isopropyl alcohol raises the melting point to 173–173.5°

Analysis.—Calcd. for $C_7H_8N_4O_5$: C, 36.85; H, 3.53; N, 24.56. Found: C, 36.61; H, 3.45; N, 24.48.

What is claimed is:

The compound-N-(methylcarbamyl)-5-nitro-2-furamidoxime of the formula:

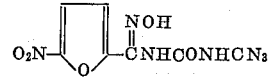

References Cited by the Examiner

UNITED STATES PATENTS

| | | | |
|---|---|---|---|
| 3,026,332 | 3/1962 | Holland et al. | 260—347.3 |
| 3,043,853 | 7/1962 | Ebetino | 260—347.3 |
| 3,075,877 | 1/1963 | Johnson | 167—53.1 |
| 3,085,937 | 4/1963 | Hirayama | 167—53.1 |

OTHER REFERENCES

Pinner, Plastics (April 1947), pages 206–210.

HENRY R. JILES, *Acting Primary Examiner*.
NICHOLAS S. RIZZO, *Examiner*.

UNITED STATES PATENT OFFICE
CERTIFICATE OF CORRECTION

Patent No. 3,260,732　　　　　　　　　　　　　　July 12, 1966

Harry Raymond Snyder, Jr.

It is hereby certified that error appears in the above numbered patent requiring correction and that the said Letters Patent should read as corrected below.

Column 2, lines 26 to 30, the formula should appear as shown below instead of as in the patent:

Signed and sealed this 1st day of August 1967.

(SEAL)
Attest:

EDWARD M. FLETCHER, JR.　　　　　　　　　　EDWARD J. BRENNER
Attesting Officer　　　　　　　　　　　　　Commissioner of Patents